No. 754,310. PATENTED MAR. 8, 1904.
H. M. HORINE.
COOKING UTENSIL.
APPLICATION FILED DEC. 14, 1903.

NO MODEL.

Witnesses:
Harry C. White
Ray White

Inventor:
Hanniel M. Horine.
By Howard M. Cox Atty.

No. 754,310. Patented March 8, 1904.

UNITED STATES PATENT OFFICE.

HANNIEL M. HORINE, OF CHICAGO, ILLINOIS.

COOKING UTENSIL.

SPECIFICATION forming part of Letters Patent No. 754,310, dated March 8, 1904.

Application filed December 14, 1903. Serial No. 185,082. (No model.)

*To all whom it may concern:*

Be it known that I, HANNIEL M. HORINE, a citizen of the United States, residing in the city of Chicago, county of Cook, and State of Illinois, have invented a new and useful Improvement in Cooking Utensils, of which the following is a specification.

My invention relates to cooking utensils, such as skillets, frying-pans, and other vessels provided with handles; and the objects of my invention are, first, to provide a valve in the side of the vessel through which the fluid contents of the vessel may be drained; second, to provide means for operating the drain-valve by the same hand of the operator which supports the utensil by the handle thereof, and, third, to provide the various details of construction hereinafter set forth, and embodied in the accompanying claims. I obtain these objects by the mechanism illustrated in the accompanying drawings, in which—

Figure 1:
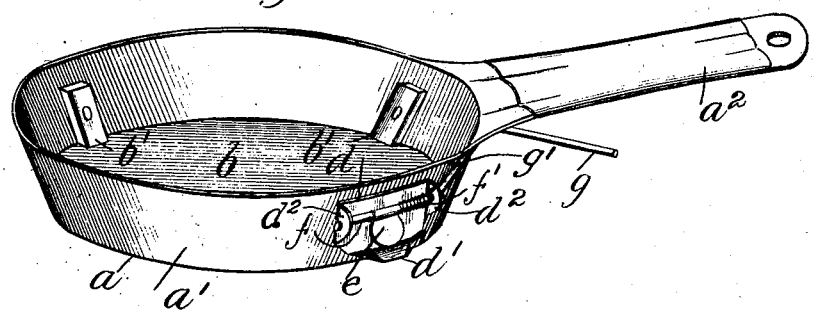
Figure 2:
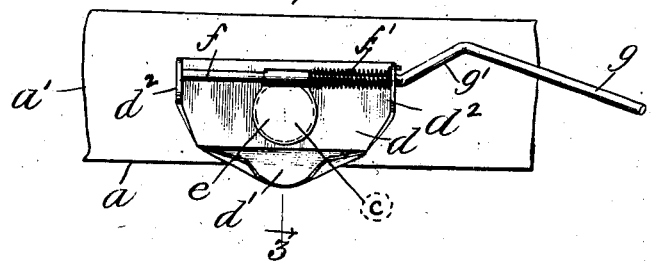
Figure 3:
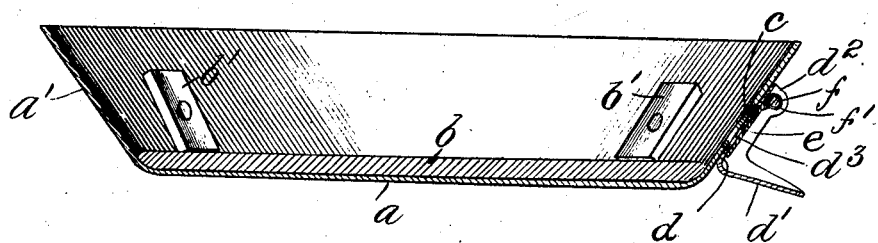

Figure 1 is a perspective view of the complete utensil. Fig. 2 is a fragmentary view looking at the face of the drain-valve; and Fig. 3 is a central vertical sectional view of the utensil, taken on the line 3 3, Fig. 2, showing the preferred construction of the valve and spout.

$a$ represents the bottom of the vessel, and $a'$ the sides thereof, to which is attached the handle $a^2$. The bottom of the vessel is flat, and by preference the bottom and sides are constructed of a single piece of sheet metal in the manner in which frying-pans, skillets, and similar utensils are commonly constructed.

In the bottom of the vessel is fitted a layer or thin slab $b$ of soapstone, which is well known to possess properties oleaginous in their nature, which prevent the adhesion of food cooked thereon. Said layer $b$ fits closely to the sides of the vessel and is held down tightly by means of the lugs $b'$, which are riveted to the sides of the vessel in such manner as to bear upon the top of the layer $b$ and hold the layer in close contact with the bottom of the vessel to prevent the entrance of fluid between said layer of soapstone and the bottom of the vessel.

At the side of the vessel at a point near the base of the handle, and preferably a slight distance to the left thereof, is an aperture $c$, through which the excess liquid, such as lard or water, depending upon the nature of the food being cooked, is allowed to flow out. Said aperture is located, preferably, near the bottom of the vessel, so that said excess liquid may be readily drained off without tilting the pan to too great an angle, and the object in having the aperture located to the left of the handle is that the operator may drain off the liquid contents of the vessel by tilting the same to the right, which is usually the most convenient direction.

In order to properly lead off the excess liquid when the utensil is being drained, a spout $d'$ is secured to the sides of the vessel beneath the aperture $c$ therein. In the preferred construction said spout forms part of a one-piece spout-piece $d$, which is adapted to conform to the sides of the vessel and is secured thereto at the drain-aperture $c$ therein. Said spout has an aperture $d^3$, corresponding to aperture $c$, and at the sides of said spout-piece are formed the ears $d^2 d^2$. The valve or stopper $e$ is yieldingly secured in front of the aperture $c$ for closing the same and is rigidly fixed upon the rod $f$, which has a bearing in the said ears $d^2 d^2$. For the purpose of normally holding the valve $e$ in a closed position a spring $f'$ is coiled around the rod $f$, one end of said spring being attached to said rod and the other end to the adjacent one of the ears $d^2$.

The parts are constructed in such manner that the valve $e$ normally closes the aperture $c$, but may be swung so as to open said aperture by rotating the rod $f$ against the influence of the spring $f'$. This rotation of the rod $f$ is accomplished through the agency of a controlling-lever $g$. Said lever $g$ is preferably formed of a single piece with the rod $f$ and has a bend $g'$, so that the lever portion $g$ may lie directly beneath the handle $a^2$. The relative angles of rod $f$ and lever $g$ are such that when the valve $e$ is closed the lever $g$ will extend obliquely downward beneath said handle.

The parts are so related that the forcing of lever $g$ toward the handle $a^2$ causes the valve $e$ to open.

In operation when it is desired to remove any excess liquid from the vessel during cooking the operator grasps the vessel by the handle $a^2$ in the right hand, placing the forefinger upon the lever $g$. The vessel is then tilted slightly, the operator at the same time pressing the forefinger against the lever $g$, so as to draw said lever toward the handle $a^2$. This swings the valve $e$ so as to uncover the aperture $c$, and the excess liquid may then be poured off.

What I claim as new, and desire to secure by Letters Patent, is—

1. A cooking utensil consisting of a vessel having rising sides, an aperture in the sides of the vessel, a spout-piece secured to the side of the vessel below the aperture therein, said spout-piece having a spout and also having ears formed at the sides of said aperture; a valve for closing said aperture and a rod journaled in the ears of said spout-piece, said valve being mounted on said rod for the purpose described.

2. In a cooking utensil, the combination of a vessel having rising sides and an aperture therein; a handle, a spout-piece secured to the sides of the vessel at the aperture therein; a spout on said spout-piece; ears on said spout-piece; a rod journaled in said ears; a spring-influenced valve mounted on said rod in position to control the aperture in the side of the vessel; and a lever for operating said valve, said lever connecting with said rod and bent so as to lie beneath said handle.

3. A cooking utensil consisting of a vessel having rising sides; an aperture in the sides of the vessel; a spout-piece secured to the side of the vessel below the aperture therein, said spout-piece having ears formed thereon at the sides of said aperture; a valve for closing said aperture; a rod journaled in the ears of said spout-piece, said valve being mounted on said rod; and a spring for holding said valve closed.

HANNIEL M. HORINE.

Witnesses:
  J. I. McDONALD,
  HOWARD M. COX.